United States Patent
Cheikh

(10) Patent No.: US 10,985,593 B2
(45) Date of Patent: Apr. 20, 2021

(54) METHOD FOR CHARGING A BATTERY BY NEAR-FIELD COMMUNICATION

(71) Applicants: Continental Automotive France, Toulouse (FR); Continental Automotive GmbH, Hannover (DE)

(72) Inventor: Mohamed Cheikh, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 66 days.

(21) Appl. No.: 16/477,956

(22) PCT Filed: Jan. 8, 2018

(86) PCT No.: PCT/FR2018/050035
§ 371 (c)(1),
(2) Date: Jul. 15, 2019

(87) PCT Pub. No.: WO2018/134497
PCT Pub. Date: Jul. 26, 2018

(65) Prior Publication Data
US 2019/0372385 A1 Dec. 5, 2019

(30) Foreign Application Priority Data
Jan. 17, 2017 (FR) ...................................... 1750345

(51) Int. Cl.
*H02J 7/00* (2006.01)
*H02J 7/14* (2006.01)
(Continued)

(52) U.S. Cl.
CPC .......... *H02J 7/025* (2013.01); *G06K 19/0708* (2013.01); *H01M 10/44* (2013.01);
(Continued)

(58) Field of Classification Search
USPC ........................................................ 320/108
See application file for complete search history.

(56) References Cited

U.S. PATENT DOCUMENTS

| 10,199,849 B1* | 2/2019 | Bell | H04W 4/80 |
| 2007/0139000 A1* | 6/2007 | Kozuma | H02J 7/025 320/108 |

(Continued)

OTHER PUBLICATIONS

English Translation of Written Opinion for International Application No. PCT/FR2018/050035, dated Mar. 5, 2018, 6 pages.

(Continued)

*Primary Examiner* — Alexis B Pacheco
(74) *Attorney, Agent, or Firm* — RatnerPrestia

(57) ABSTRACT

A method for charging a power supply battery of a portable device by near-field communication with a base station. The method, implemented by the device, includes, the primary antenna of the base station and the secondary antenna of the device being electromagnetically coupled, the steps of modifying the coupling between the primary antenna of the base station and the secondary antenna of the device, of receiving an authentication request signal sent by the base station subsequent to the step of modifying the coupling, and of charging the power supply battery of the device from the energy of the received authentication request signal.

11 Claims, 3 Drawing Sheets

(51) Int. Cl.
    *H02J 7/02*     (2016.01)
    *H02J 50/80*     (2016.01)
    *H02J 50/10*     (2016.01)
    *H02J 50/20*     (2016.01)
    *G06K 19/07*     (2006.01)
    *H01M 10/44*     (2006.01)
    *H04B 5/00*     (2006.01)

(52) U.S. Cl.
    CPC ............ *H02J 50/10* (2016.02); *H02J 50/20* (2016.02); *H02J 50/80* (2016.02); *H04B 5/0037* (2013.01); *H01M 2220/30* (2013.01); *H02J 7/00034* (2020.01); *H02J 7/00045* (2020.01)

(56) References Cited

U.S. PATENT DOCUMENTS

| | | | | |
|---|---|---|---|---|
| 2008/0079396 | A1* | 4/2008 | Yamazaki | H02J 7/025 320/128 |
| 2012/0104997 | A1* | 5/2012 | Carobolante | H02J 7/025 320/108 |
| 2014/0245464 | A1* | 8/2014 | Chu | G07F 15/006 726/35 |
| 2015/0002093 | A1* | 1/2015 | Osada | H02J 7/0071 320/108 |
| 2015/0061404 | A1* | 3/2015 | Lamenza | H02J 50/12 307/104 |
| 2017/0018954 | A1* | 1/2017 | Lee | H04B 5/0081 |
| 2017/0085126 | A1* | 3/2017 | Leabman | H02J 17/00 |
| 2018/0309314 | A1* | 10/2018 | White, II | H02J 7/025 |
| 2019/0027970 | A1* | 1/2019 | Kawamae | H02J 7/025 |

OTHER PUBLICATIONS

International Search Report and Written Opinion for International Application No. PCT/FR2018/050035, dated Mar. 5, 2018—8 pages 2019.

\* cited by examiner

METHOD FOR CHARGING A BATTERY BY NEAR-FIELD COMMUNICATION

CROSS REFERENCE TO RELATED APPLICATIONS

This application is the U.S. National Phase Application of PCT International Application No. PCT/EP2018/050035, filed Jan. 8, 2018, which claims priority to French Patent Application No. 1750345, filed Jan. 17, 2017, the contents of such applications being incorporated by reference herein.

FIELD OF THE INVENTION

The present invention relates to the field of charging power supply batteries and relates more particularly to a method for charging a power supply battery of a portable device by means of near-field communication and to a portable near-field communication device. The invention is particularly applicable to the fast charging of batteries of small size fitted to portable devices such as contactless access badges, hands-free kits for telephone calls, Bluetooth® earpieces, etc.

BACKGROUND OF THE INVENTION

In a known manner, the passenger compartment of a motor vehicle may be accessed or the motor/engine of a motor vehicle may be started via a near-field communication (NFC) wireless communication system. Such a system comprises a detector mounted inside the vehicle, taking the form of a base station comprising what is referred to as a "primary" antenna, and a portable device comprising what is referred to as a "secondary" antenna, both of which are compatible with NFC technology. The device may for example take the form of an electronic tag, of a card, of a badge, of a box, etc.

To detect a compatible device, the base station emits an interrogation signal periodically, for example every 100 ms, and for a very short duration, for example 30 µs, so as to save energy, which interrogation signal generates an electromagnetic field in proximity to the primary antenna.

Thus, when a compatible device is placed in proximity to the base station, it modifies the electromagnetic field generated while the interrogation signal is being emitted, thereby forming a coupling between the primary antenna of the base station and the secondary antenna of the device. This coupling, which modifies the intensity of the current flowing through the primary antenna, is detected by the base station, which thus deduces therefrom that a device is in proximity.

Once a device has been detected, the base station emits an authentication request signal between two emissions of the interrogation signal, the periodic emission of the interrogation signal providing the assurance that the coupling is still in place and that the device is therefore still present in proximity to the base station. This authentication request signal includes a request to authenticate the device, which in turn responds to the base station by sending a response signal including its identifier.

If the identifier of the device is valid, the base station authorizes the unlocking of the passenger compartment or the starting of the motor/engine of the vehicle. If the device is removed, the coupling between the primary antenna and the secondary antenna is broken and any and all communication between the device and the base station is interrupted until a new coupling is detected.

The portable device may be passive, in which case it lacks a power supply battery, or else active or semi-active, in which case it includes a power supply battery.

In the case of an active or semi-active device, when the battery is empty, it is necessary for it either to be switched out or to be charged, or for the device to be replaced. Since switching out the battery, and especially the device, may prove to be very expensive, charging is usually preferred by far.

Such a charging operation may be carried out by connecting the device to an electrical network via a power supply cable, which may prove to be laborious, or by placing it on a wireless induction charging module, which is easier to use, as long as the device is compatible. Such an induction charging module may however prove to be very expensive, in particular when its capacity for fast-charging a portable device is substantial.

SUMMARY OF THE INVENTION

An aspect of the invention aims to overcome these drawbacks at least partly by providing a simple and effective solution for charging a power supply battery of a portable near-field communication device from a base station, in particular in a motor vehicle.

In particular, an aspect of the invention aims to allow the fast charging of active or semi-active batteries of small size, for example fitted to access cards, hands-free telephone kits, Bluetooth® earpieces, etc.

To this end, an aspect of the invention first relates to a method for charging a power supply battery of an active or semi-active portable device by means of near-field communication with a base station, said base station comprising what is referred to as a "primary" antenna, said device comprising what is referred to as a "secondary" antenna.

The method, implemented by the device, is noteworthy in that it comprises, the primary antenna of the base station and the secondary antenna of the device being electromagnetically coupled, the steps of modifying the coupling between the primary antenna of the base station and the secondary antenna of the device, of receiving an authentication request signal sent by the base station subsequent to said step of modifying the coupling, and of charging the power supply battery of the device from the energy of said received authentication request signal.

The method according to an aspect of the invention advantageously allows a base station suitable for near-field communication to be used to charge the battery of active or semi-active near-field communication devices. The base station may for example be mounted inside a vehicle or else be a smartphone or any other suitable near-field communication device. With the method according to an aspect of the invention, the device modifies the coupling between the device and the base station so as to cause the base station to emit at least one new authentication request signal, preferably a plurality of authentication request signals, for the purpose of charging the power supply battery of the device. The modification of the coupling, and consequently the charging of the battery, may thus be carried out rapidly, either until the battery is charged or the coupling between the device and the base station is interrupted. Moreover, the method according to an aspect of the invention allows costs to be decreased with respect to an induction charging solution by virtue of the use of a near-field communication base station that is already present, obviating the need to provide a more expensive, dedicated charging station.

It should be noted that a more obvious solution would have been to use the interrogation signals emitted periodically by the base station to charge the battery of the active or semi-active device by induction. However, as mentioned above, since these signals are emitted by the base station periodically, for example every 100 ms, and for a short duration, for example 30 µs, so as to save energy, their energy density is low. This would then result in it taking a substantial length of time to charge the battery, for example at least three hours and potentially up to 20 hours depending on the duration and the period of the detection pulses and the type of battery.

According to one aspect of the invention, the method comprises a preliminary step of electromagnetic coupling between the primary antenna of the base station and the secondary antenna of the device. This step allows the primary antenna and the secondary antenna to be initially coupled so that the device may subsequently modify the coupling thereof and thus allow the power supply battery to be charged.

Preferably, the method comprises a step of detecting the time of the end of receiving the authentication request signal, the coupling then being modified as soon as the time of the end of receiving the authentication request signal has been detected. This advantageously allows the battery to be charged almost continuously, the authentication request signals then being received one after another.

In one embodiment, the coupling is modified periodically, preferably every 500 ms at the latest, so as to result in an authentication request signal being emitted systematically.

An aspect of the invention also relates to a device, preferably a portable, active or semi-active device, for near-field communication with a base station, said base station comprising what is referred to as a "primary" antenna, said device comprising a power supply battery and what is referred to as a "secondary" antenna that is capable of being electromagnetically coupled with said primary antenna, the device being noteworthy in that it comprises means for charging the power supply battery from the energy of an authentication request signal emitted by the primary antenna and received via the secondary antenna, and means for modifying a coupling between the primary antenna and the secondary antenna.

In one advantageous embodiment, the device is an authentication device for activating a function of a motor vehicle such as, for example, unlocking access to the passenger compartment or starting the motor/engine of the vehicle.

Preferably, the means for modifying the coupling comprise a switching branch including a capacitor that is connected in parallel with a switch.

Advantageously, the means for modifying the coupling comprise means for switching said switch.

Preferably, the means for modifying the coupling are capable of detecting the time of the end of receiving the authentication request signal and of modifying the coupling as soon as said time of the end of receiving the authentication request has been detected.

As a variant or in addition, the means for modifying the coupling may be capable of modifying the coupling periodically such that a base station located in the near field periodically emits an authentication signal allowing the power supply battery of the portable device to be charged.

According to one aspect of the invention, the device is further configured to authorize the charging of the power supply battery until said power supply battery is fully charged or until the coupling between the device and the base station is interrupted.

According to another aspect of the invention, the device is further configured to detect whether the power supply battery is fully charged and, if so, to cease any and all modification of the coupling via the modifying means once the battery is fully charged.

Lastly, an aspect of the invention relates to a system for charging the power supply battery of a portable near-field communication device, said system comprising a device such as presented above and a base station comprising what is referred to as a "primary" antenna that is capable of being electromagnetically coupled with the secondary antenna of said device, said base station being configured to emit, via said primary antenna, at least one interrogation signal, to detect a (new) coupling with the secondary antenna of the device or a variation in an existing coupling with the secondary antenna of the device, and to emit, via the primary antenna, an authentication request signal when a coupling with the secondary antenna has been achieved or once a modification to the coupling with the secondary antenna has been detected.

Preferably, the base station is mounted inside a motor vehicle.

Advantageously, the base station may be a mobile telephone, for example a smartphone, that is capable of near-field communication (NFC) with a device for the purpose of charging the battery thereof.

BRIEF DESCRIPTION OF THE DRAWINGS

Other features and advantages of aspects of the invention will become apparent from the following description provided with reference to the appended figures that are given by way of non-limiting example and in which identical references are given to similar objects.

DETAILED DESCRIPTION OF THE PREFERRED EMBODIMENTS

The system according to an aspect of the invention allows a power supply battery of a portable device to be charged by a base station through the use of near-field communication technology.

The term "near-field communication" is understood to mean that communication is carried out by radio communication over a short distance, for example a few centimeters. In the context of this aspect of the invention, such near-field communication technologies group together in particular RFID (radiofrequency identification) technologies and the NFC standard or any similar technology.

An aspect of the present invention targets in particular active or semi-active devices such as RFID access badges, for example for accessing the passenger compartment of a motor vehicle, hands-free kits for mobile telephones such as for example Bluetooth® or BLE (Bluetooth® Low Energy) earpieces, but also any type of near-field communication device, such as for example a smartphone, the battery of which needs to be recharged by near-field communication.

In the non-limiting example described below, the base station is mounted inside a motor vehicle. It should be noted however that an aspect of the invention relates more generally to the charging of a power supply battery of a portable device by means of any type of base station using near-field communication technology, and which is not necessarily mounted inside a vehicle. It should be noted in particular that the base station may be a smartphone or any other near-field communication device.

Figure 1:
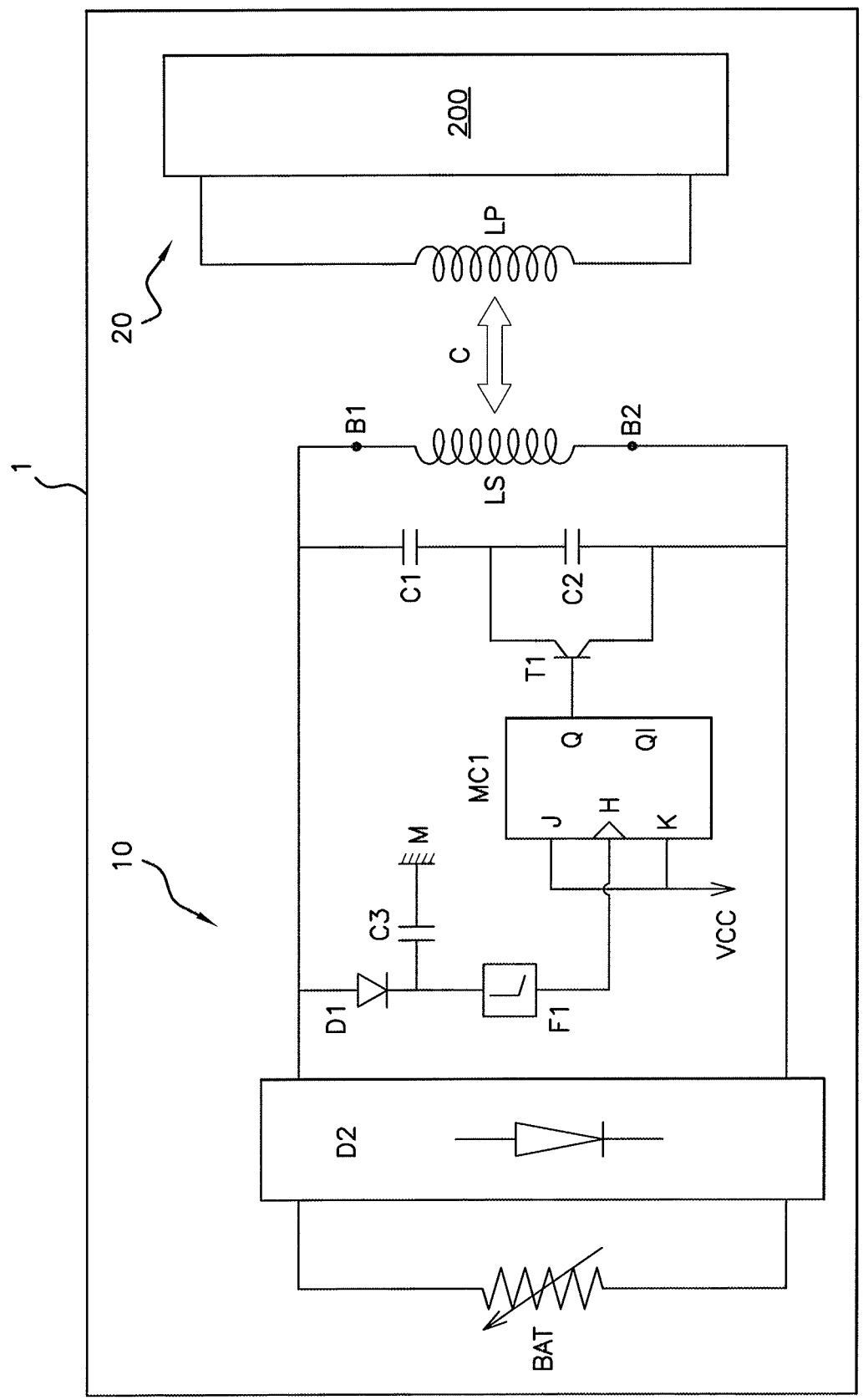
FIG. 1 schematically illustrates one embodiment of the system according to an aspect of the invention.
Figure 2:
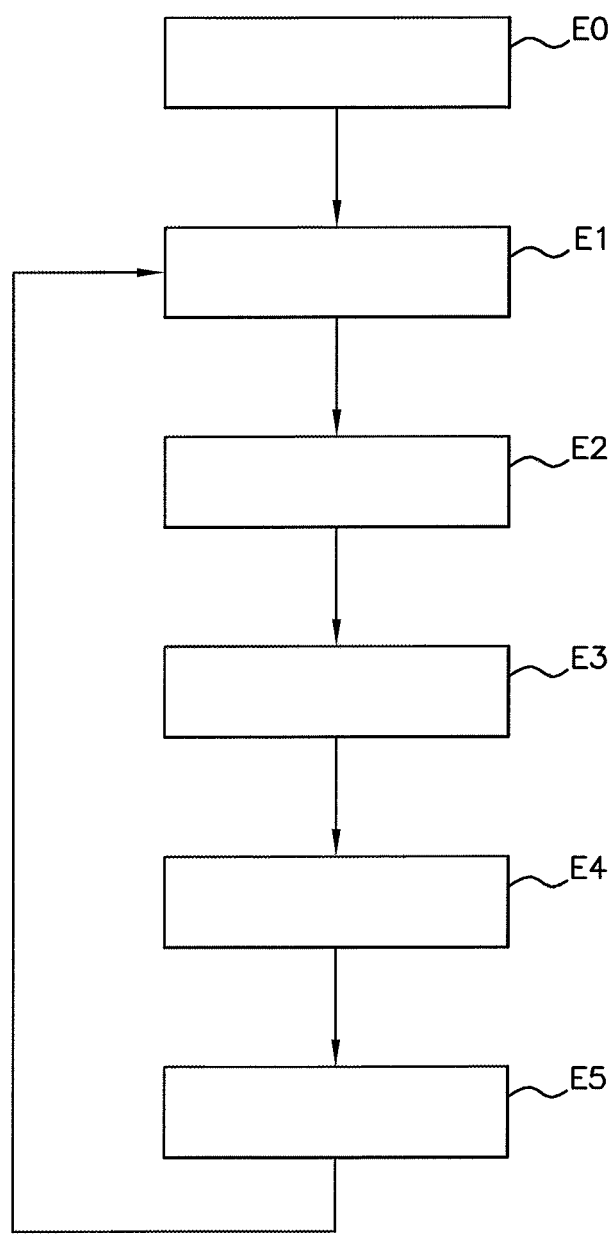
FIG. 2 schematically illustrates one embodiment of the method according to an aspect of the invention.

FIG. 1 schematically shows one embodiment of the system 1 according to an aspect of the invention.

The near-field communication system 1 comprises a portable device 10 and a base station 20.

The portable device 10 is what is referred to as an "active" or "semi-active" near-field communication device, i.e. it comprises a power supply battery BAT for supplying electricity. In this case in point, the power supply battery is capable of being charged as will be described below.

To allow communication between the device 10 and the base station 20, the base station 20 comprises what is referred to as a "primary" antenna LP and the device 10 comprises what is referred to as a "secondary" antenna LS, both of which are capable of being electromagnetically coupled with one another and of emitting and receiving various types of signals, for example at the frequency of 13.56 MHz. In this example, the primary antenna LP of the base station 20 and the secondary antenna LS of the device 10 both take the form of an inductive coil.

To detect the device 10, the base station 20 is configured to emit, via the primary antenna LP, an interrogation signal periodically, for example every 100 ms, and for a very short duration, for example 30 µs, so as to save energy, the emission of which interrogation signal generates an electromagnetic field in proximity to said primary antenna LP.

When the secondary antenna LS of the device 10 is immersed in an electromagnetic field generated by the primary antenna LP of the base station 20 during the emission of an interrogation signal, coupling takes place between said secondary antenna LS and said primary antenna LP.

The base station 20 comprises a control module 200 that is configured to perform a plurality of tasks.

First, the control module 200 is configured to detect a variation in the intensity of the current flowing through the primary antenna LP or in the voltage across the terminals of the primary antenna LP, which are synonymous with the establishment of a coupling or with the modification of an existing coupling between the primary antenna LP of the base station 20 and the secondary antenna LS of the device 10.

The control module 200 is further configured to send, to the device 10, a request signal after having detected a new coupling or a variation in a pre-existing coupling between its primary antenna LP and the secondary antenna LS. The energy density of this authentication request signal is significantly higher than the energy density of an interrogation signal and therefore allows the power supply battery BAT to be charged more quickly. The authentication request signal includes in particular a request by the base station 20 for the device 10 to authenticate itself.

When it receives an authentication request signal, the device 10 is configured:
in what is referred to as a "communication" mode, to transmit a response signal to the base station 20, this response signal comprising at least the identifier of said device 10;
in what is referred to as a "charging" mode, to charge its power supply battery using the energy of the authentication request signal.

The control module 200 is also configured to receive a response signal emitted by the device 10 and to use it according to the particular application. Thus, for example, in the case of a motor vehicle, if the identifier of the device 10 is valid, the base station 20 may be configured to authorize the unlocking of the passenger compartment or the starting of the motor/engine of the vehicle.

Communication mode may be implemented first to authenticate the device 10 then, next, the device 10 may switch to charging mode so as to allow its power supply battery BAT to be charged.

Switching between communication mode and charging mode may take place automatically, for example depending on the need to charge the power supply battery BAT, or be activated manually by a user.

To allow its power supply battery BAT to be charged from the energy of a received authentication request signal, the device 10 comprises means for charging said power supply battery BAT. In other words, the charging means are configured to charge the power supply battery from the energy of an authentication request signal received from the primary antenna LP of the base station 20.

In the example of FIG. 1, the charging means comprise a rectifier circuit D2 connected both to the power supply battery BAT and to a first terminal B1 and a second terminal B2 of the secondary antenna LS, allowing the signal delivered by the secondary antenna LS to be rectified in order to charge the power supply battery BAT. By way of example, this rectifier D2 may take the form of a diode bridge, known per se.

According to an aspect of the invention, the device 10 further comprises means for modifying the coupling between the secondary antenna of the device 10 and the primary antenna of a base station 20.

Preferably, the means for modifying the coupling are capable of modifying the coupling as soon as the time of the end of receiving an authentication request signal received from the base station 20 has been detected. Specifically, this allows the base station 20 to quickly detect a modification of the coupling between its primary antenna LP and the secondary antenna LS of the device 10 so as to emit a new authentication request signal.

To this end, in the example of FIG. 1, the means for modifying the coupling comprise a diode D1 that is connected both to the first terminal B1 of the secondary antenna LS and to the input of a high-pass filter F1. The rectifier diode D1 allows a sinusoidal signal received by the base station 20 to be transformed into a DC signal for charging the battery BAT.

A decoupling capacitor C3 is connected between a ground M and the midpoint between the diode D1 and the high-pass filter F1 so as to filter out the parasitic signals entering the coil constituting the secondary antenna LS.

Still with reference to FIG. 1, the means for modifying the coupling next comprise a switching branch including both a matching capacitor C2, connected in parallel with a switch, and means MC1 for switching said switch. In this non-limiting example, the switch consists of a transistor T1, for example an NPN or PNP transistor, the emitter and the collector of which are connected, respectively, to one of the branches of the capacitor C2.

The device 10 also comprises a matching capacitor C1, connected in series between the first terminal of the secondary antenna LS and the midpoint between the capacitor C2 and the transistor T1, allowing the coil constituting the secondary antenna LS to be matched to the desired operating frequency.

In the illustrated embodiment, the switching means MC1 take the form of a JK flip-flop, known per se. As a variant, it should be noted that any other suitable switching means could be used.

The clock of the JK flip-flop is connected to the output of the high-pass filter F1. The J and K terminals of the JK flip-flop are connected to a supply voltage Vcc. In the case of a PNP transistor, the transistor T1 is connected to the Q output of the JK flip-flop. In the case of an NPN transistor, the transistor T1 is connected to the inverse, Q\ output of the JK flip-flop. In the example illustrated in FIG. 1, the transistor is a PNP transistor and the Q terminal of the JK flip-flop is connected to the base of the transistor T1.

Preferably, the device 10 may be configured to detect whether the power supply battery BAT is fully charged such that the modifying means stop modifying the coupling.

Preferably again, the device 10 may be configured to authorize the charging of the power supply battery BAT until it is charged or until the coupling between the secondary antenna LS and the primary antenna LP is interrupted.

An aspect of the invention will now be described in terms of the implementation thereof with reference to FIGS. 1 to 6.

In this exemplary application, the portable device 10 is an RFID badge intended to be carried by a user to allow his or her authentication by a base station 20 mounted inside a motor vehicle in order for said base station 20 to activate a function of the vehicle such as, for example, unlocking the passenger compartment or starting the motor/engine of the vehicle.

In a preliminary step E0, an electromagnetic coupling C is first produced between the primary antenna LP of the base station 20 and the secondary antenna LS of the device 10.

Figure 3:
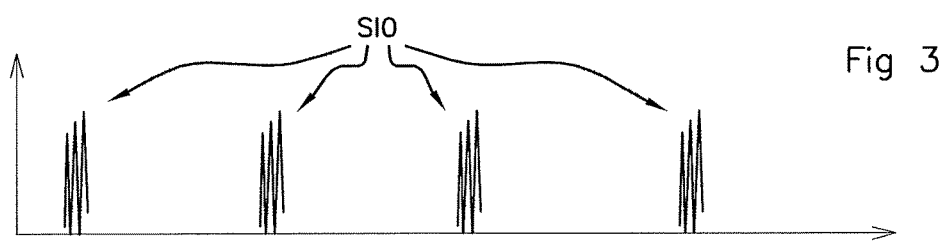
FIG. 3 is an exemplary graphical representation of the periodic emission of interrogation signals by the primary antenna of a base station in the absence of coupling with a device.

FIG. 3 illustrates the periodic emission, by the base station 20, of an interrogation signal SI0 in the absence of a device 10 in proximity (i.e. in the absence of coupling C). This interrogation signal SI0 is emitted for example every 100 ms and for a very short time, for example 30 μs, so as to save energy, such an emission generating an electromagnetic field in proximity to the primary antenna LP of the base station 20.

Figure 4:
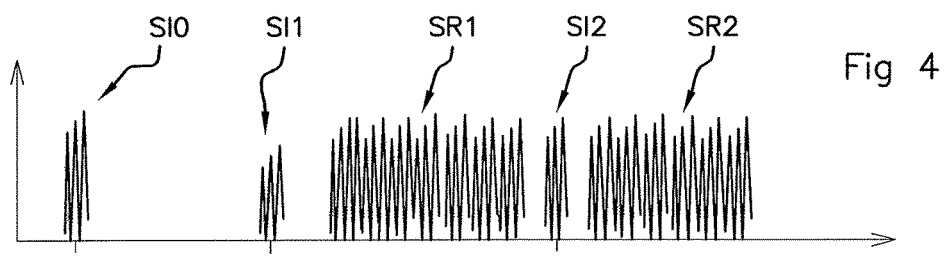
FIG. 4 is an exemplary graphical representation of the emission of interrogation signals in alternation with the emission of authentication request signals by the primary antenna of a base station of the system of FIG. 1.

With reference to FIG. 4, when the device 10 is placed in proximity to the base station 20, for example less than 10 cm away, a coupling C is produced between the primary antenna LP of the base station 20 and the secondary antenna LS of the device 10 while the interrogation signal SI1 is being emitted, which then modifies the intensity of the current flowing through the primary antenna LP (for example by increasing or decreasing its amplitude, for example).

The base station 20 then detects this coupling C and deduces therefrom that the device 10 is requesting communication with said base station 20. The base station 20 then transmits, via the primary antenna LP, an authentication request signal SR1 to the device 10, which receives it via its secondary antenna LS.

When the device 10 switches to charging mode so as to charge its power supply battery BAT and according to an aspect of the invention, the device 10 will trigger the emission, by the base station 20, of a plurality of successive authentication request signals that it will use to charge the power supply battery BAT.

Thus, first, in a step E1, still with reference to FIG. 4, the device 10 modifies the existing coupling C produced in step E0. More specifically, in step E1, the device 10 uses its switching means MC1 to modify the intensity of the current flowing through its secondary antenna LS and thus to modify the coupling C between said secondary antenna LS and the primary antenna LP of the base station 20.

Figure 5:
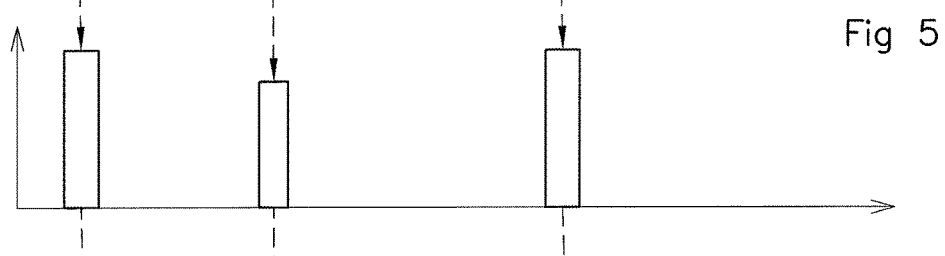
FIG. 5 is an exemplary graphical representation of the clock signals of a flip-flop for switching the device of the system of FIG. 1.
Figure 6:
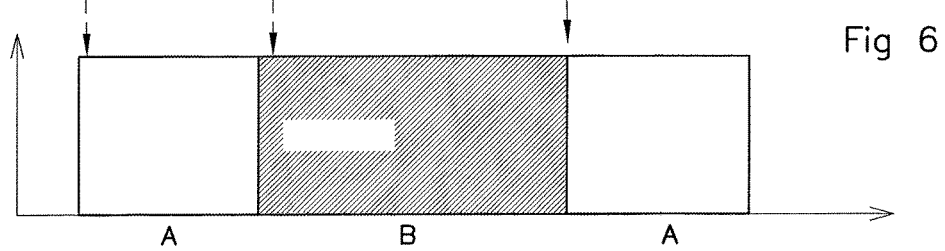
FIG. 6 is an exemplary graphical representation of the state of the switch of the device of the system of FIG. 1 when it is controlled by the clock signals illustrated in FIG. 5.

To achieve this, with reference to FIGS. 5 and 6, when the transistor T1 is letting current through (i.e. the switch is closed), the capacitor C2 is shorted (state A in FIG. 6) and the voltage across the terminals of the primary antenna LP is equal to the voltage across the terminals of the capacitor C1. This voltage allows the JK flip-flop to switch via its clock H so as to control the transistor T1 so that it no longer allows current through (switch open). In this case, the voltage across the terminals of the primary antenna varies and becomes equal to the sum of the voltage across the terminals of the capacitor C1 and of the voltage across the terminals of the capacitor C2, which is then on (state B in FIG. 6). Modifying the coupling C by means of the device 10 modifies the intensity of the current flowing through the primary antenna LP of the base station 20, which results in the amplitude of the interrogation signal being modified, for example decreased for the interrogation signal SI2 in the example of FIG. 4. Modifying the intensity of the current flowing through the primary antenna LP modifies the current flowing through the diode D1 and the filtering circuit F1 such that the clock signal of the JK flip-flop is modified once again. The JK flip-flop then once again switches the two-position switch (here the transistor T1) to its closed position until the next emission of an interrogation signal by the base station 20. Such a switching operation is thus performed each time the amplitude of the interrogation signal SI1, SI2 varies.

With reference to FIG. 4, modifying the coupling modifies the interrogation signal SI2, which results in the intensity of the current flowing through the primary antenna LP of the base station 20 being modified. The base station 20 perceives this modification as a new coupling C (i.e. with a new device requesting to authenticate itself) and then triggers the emission of a new authentication request signal SR2 in a step E2.

This authentication request signal SR2 is received by the secondary antenna LS of the device 10 in a step E3, which uses it to charge the power supply battery BAT in a step E4.

The device 10 then detects, in a step E5, the time of the end of receiving the authentication request signal SR1 and then once again proceeds to modify the coupling C between the primary antenna LP and the secondary antenna LS (step E1) during the emission of the next interrogation signal SI2 so as to receive a new authentication request signal SR2 and so on.

The successive authentication request signals are delivered to the power supply battery BAT by the rectifier circuit D2 so as to charge it quickly.

The modification of the coupling C and hence the emission of request signals allowing the power supply battery BAT to be charged continues for as long as the device 10 chooses, for example until the power supply battery BAT is fully charged or the device 10 is removed, interrupting the coupling C.

The method according to an aspect of the invention therefore advantageously allows the emission of a plurality of successive authentication request signals to be triggered so as to quickly and effectively charge the power supply battery BAT of the device 10. The method is particularly effective when it comes to charging batteries of small capacity, delivering for example less than 2 W of power. The battery of an RFID access badge or of a Bluetooth® earpiece may thus be easily and quickly charged in a few minutes.

The invention claimed is:

1. A method for charging a power supply battery of a portable device by near-field communication with a base station, said base station comprising a primary antenna, said portable device comprising a secondary antenna, said method, implemented by the portable device comprising:
   electromagnetically coupling the primary antenna of the base station and the secondary antenna of the portable device;
   performing, by the portable device, periodic modifications of the coupling between the primary antenna of the base station and the secondary antenna of the portable device, by periodically modifying the current flowing through the secondary antenna;
   periodically receiving, by the portable device through the secondary antenna, a respective authentication request signal sent by the base station in response to each of the periodic modifications of the coupling, each respective authentication request signal requesting a response from the portable device; and
   charging the power supply battery of the portable device using the energy of each said received authentication request signal.

2. The method as claimed in claim 1, the method further comprising detecting a time of an end of receiving the authentication request signal and wherein the coupling is modified as soon as the time of the end of receiving the authentication request signal has been detected.

3. The method as claimed in claim 1, wherein the coupling is modified periodically.

4. The method as claimed in claim 3, wherein the coupling is modified every 500 ms at the latest.

5. A system for charging a power supply battery of a portable near-field communication device, said system comprising:
   a portable device comprising a secondary antenna; and
   a base station comprising a primary antenna that is capable of being electromagnetically coupled with the secondary antenna of said portable device,
   wherein the portable device is configured to perform periodic modifications of the coupling between the primary antenna of the base station and the secondary antenna of the portable device, by periodically modifying the current flowing through the secondary antenna,
   wherein said base station is configured to:
      emit, via said primary antenna, at least one interrogation signal;
      detect the periodic modifications of the coupling with the secondary antenna of the portable device, and
      in response to detecting of the periodic modifications, periodically emit, via the primary antenna, a respective authentication request signal, the respective authentication request signal requesting a response from the portable device,
   wherein the portable device is configured to:
      periodically receive the respective authentication request signal from the base station; and
      charge the power supply battery of the portable device using the energy of said received authentication request signal.

6. The system as claimed in claim 5, wherein the device further comprising:
   means for charging the power supply battery from energy of an authentication request signal emitted by the primary antenna and received via the secondary antenna; and
   means for modifying the coupling between the primary antenna and the secondary antenna.

7. The system as claimed in claim 6, wherein the means for modifying the coupling comprise a switching branch including a capacitor that is connected in parallel with a switch.

8. The system as claimed in claim 7, wherein the means for modifying the coupling comprise means for switching said switch.

9. The system as claimed in claim 6, wherein the device is further configured to authorize the charging of the power supply battery until said power supply battery is fully charged or until the coupling between the device and the base station is interrupted.

10. The system as claimed in claim 6, wherein the device is further configured to detect whether the power supply battery is fully charged and, if so, to cease any and all modification of the coupling via the modifying means.

11. The method as claimed in claim 2, wherein the coupling is modified periodically.

* * * * *